(12) United States Patent
Nishimura et al.

(10) Patent No.: US 10,471,613 B2
(45) Date of Patent: Nov. 12, 2019

(54) ELECTRICAL APPLIANCE WITH SWITCHABLE OPERATION MODES

(71) Applicant: Panasonic Intellectual Property Management Co., Ltd., Osaka (JP)

(72) Inventors: Shinji Nishimura, Shiga (JP); Takafumi Ohba, Shiga (JP); Kotaro Yanagi, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 40 days.

(21) Appl. No.: 15/073,637

(22) Filed: Mar. 17, 2016

(65) Prior Publication Data

US 2016/0307712 A1 Oct. 20, 2016

(30) Foreign Application Priority Data

Apr. 15, 2015 (JP) .................................. 2015-083554

(51) Int. Cl.
*B26B 19/38* (2006.01)
*G06F 3/023* (2006.01)

(52) U.S. Cl.
CPC ........ *B26B 19/3886* (2013.01); *B26B 19/388* (2013.01); *G06F 3/023* (2013.01)

(58) Field of Classification Search
CPC ....................... B26B 19/3886; B26B 21/4062
See application file for complete search history.

(56) References Cited

U.S. PATENT DOCUMENTS

| 5,544,382 A * | 8/1996 | Giuliani ................. | A61C 17/22 |
| | | | 15/22.1 |
| 2005/0144784 A1* | 7/2005 | Ibuki ...................... | B26B 19/28 |
| | | | 30/41 |

(Continued)

FOREIGN PATENT DOCUMENTS

| CN | 1628014 A | 6/2005 |
| CN | 101106782 A | 1/2008 |

(Continued)

OTHER PUBLICATIONS

Panasonic, "Operating Instructions (Household) Rechargeable Shaver Model No. ES-LT71", Jun. 11, 2010, retrieved from <ftp://ftp.panasonic.com/beauty/om/es-lt71_mul_om.pdf>.*

(Continued)

*Primary Examiner* — Rexford N Barnie
*Assistant Examiner* — David A Shiao
(74) *Attorney, Agent, or Firm* — McDermott Will & Emery LLP (57) ABSTRACT

Electric appliance (1) includes control section (31) having a plurality of operation modes, driving source (21) controlled by control section (31), and switch (12) for switching between the operation modes. Control section (31) is configured to perform a first determination and a second determination in response to an operation duration of switch (12) in order to determine a type of the operation of switch (12), and to set an operation mode after the operation of switch (12) in response to the results of the first and second determinations and an operation mode before the operation of switch (12). In the present aspect, the operability of switching between the operation modes in electric appliance (1) is improved.

6 Claims, 8 Drawing Sheets

(56) References Cited

U.S. PATENT DOCUMENTS

| | | | | |
|---|---|---|---|---|
| 2007/0050997 | A1* | 3/2007 | Schnak | B26B 21/38 30/526 |
| 2007/0183269 | A1* | 8/2007 | Baba | G04F 1/005 368/110 |
| 2008/0307594 | A1* | 12/2008 | Gatzemeyer | A46B 5/021 15/105 |
| 2011/0005015 | A1* | 1/2011 | Iwahori | A61C 17/221 15/22.1 |
| 2011/0314677 | A1* | 12/2011 | Meier | A46B 5/0062 30/41.8 |
| 2016/0031100 | A1* | 2/2016 | Provolo | B26B 19/14 30/41.6 |
| 2016/0338807 | A1* | 11/2016 | Bloch | A61C 17/221 |

FOREIGN PATENT DOCUMENTS

| | | |
|---|---|---|
| EP | 1512502 | 3/2005 |
| JP | 2004-016285 A | 1/2004 |
| JP | 2006-288892 A | 10/2006 |
| JP | 47517808 | 8/2011 |
| JP | 2013-027502 | 2/2013 |
| JP | 2014-224661 A | 12/2014 |

OTHER PUBLICATIONS

Philips Norelco, "SmartTouch-XL 9190XL, 9195XL", Jul. 15, 2005, retrieved from <https://philips.encompass.com/shop/model_research_docs/?file=/NOR/om/9195XL_41.pdf>.*

The Extended European Search Report dated Sep. 19, 2016 for the related European Patent Application No. 16161498.7.

Philips: "User manual Philips RQ1100 series", Apr. 15, 2014 (Apr. 15, 2014), pp. 1-25, XP055300772, Retrieved from the Internet: URL:http://www.p4c.philips.com/cgi-bin/cpindex.pl?ctn=RQ1150/17&scy=PL&slg=ENG?ctn=RQ1150/17&hlt=Link_UserManuals&mid=Link_UserManuals&scy=PL&slg=ENG [retrieved on Sep. 7, 2016].

English Translation of Chinese Search Report dated Oct. 24, 2018 for the related Chinese Patent Application No. 201610237244.0.

Philips, RQ1100 series User manual, Philips, Mar. 13, 2014, p. 8-11.

* cited by examiner

| OPERATION MODE | SWITCH OPERATION | OPERATION MODE AFTER SWITCH OPERATION |
|---|---|---|
| STOP MODE | SHORT PRESS | DRIVE MODE |
| | LONG PRESS | WASHING MODE |
| DRIVE MODE | SHORT PRESS | STOP MODE |
| | LONG PRESS | LOCK MODE |
| WASHING MODE | SHORT PRESS | STOP MODE |
| | LONG PRESS | — |
| LOCK MODE | SHORT PRESS | — |
| | LONG PRESS | DRIVE MODE |

FIG. 5A

| OPERATION MODE | SWITCH OPERATION | OPERATION MODE AFTER SWITCH OPERATION |
|---|---|---|
| STOP MODE | SHORT PRESS | DRIVE MODE |
| STOP MODE | LONG PRESS | LOCK MODE |
| DRIVE MODE | SHORT PRESS | STOP MODE |
| DRIVE MODE | LONG PRESS | WASHING MODE |
| WASHING MODE | SHORT PRESS | DRIVE MODE |
| WASHING MODE | LONG PRESS | — |
| LOCK MODE | SHORT PRESS | — |
| LOCK MODE | LONG PRESS | STOP MODE |

FIG. 5B

| OPERATION MODE | SWITCH OPERATION | OPERATION MODE AFTER SWITCH OPERATION |
|---|---|---|
| STOP MODE | SHORT PRESS | DRIVE MODE |
| STOP MODE | LONG PRESS | WASHING MODE |
| DRIVE MODE | SHORT PRESS | STOP MODE |
| DRIVE MODE | LONG PRESS | LOCK MODE |
| WASHING MODE | SHORT PRESS | STOP MODE |
| WASHING MODE | LONG PRESS | DRIVE MODE |
| LOCK MODE | SHORT PRESS | — |
| LOCK MODE | LONG PRESS | WASHING MODE |

FIG. 6

| OPERATION MODE | SWITCH OPERATION | OPERATION MODE AFTER SWITCH OPERATION |
|---|---|---|
| STOP MODE | SHORT PRESS | DRIVE MODE |
| | LONG PRESS | WASHING MODE |
| | DOUBLE PRESS | LOCK MODE |
| DRIVE MODE | SHORT PRESS | STOP MODE |
| | LONG PRESS | LOCK MODE |
| | DOUBLE PRESS | WASHING MODE |
| WASHING MODE | SHORT PRESS | STOP MODE |
| | LONG PRESS | — |
| | DOUBLE PRESS | LOCK MODE (OR DRIVE MODE) |
| LOCK MODE | SHORT PRESS | — |
| | LONG PRESS | DRIVING MODE |
| | DOUBLE PRESS | STOP MODE (OR WASHING MODE) |

FIG. 7A

| OPERATION MODE | SWITCH OPERATION | OPERATION MODE AFTER SWITCH OPERATION |
|---|---|---|
| STOP MODE | SHORT PRESS | DRIVE MODE |
| | LONG PRESS | LOCK MODE |
| | DOUBLE PRESS | WASHING MODE |
| DRIVE MODE | SHORT PRESS | STOP MODE |
| | LONG PRESS | WASHING MODE |
| | DOUBLE PRESS | LOCK MODE |
| WASHING MODE | SHORT PRESS | DRIVE MODE |
| | LONG PRESS | — |
| | DOUBLE PRESS | STOP MODE (OR LOCK MODE) |
| LOCK MODE | SHORT PRESS | — |
| | LONG PRESS | STOP MODE |
| | DOUBLE PRESS | DRIVE MODE (OR WASHING MODE) |

FIG. 7B

| OPERATION MODE | SWITCH OPERATION | OPERATION MODE AFTER SWITCH OPERATION |
|---|---|---|
| STOP MODE | SHORT PRESS | DRIVE MODE |
| STOP MODE | LONG PRESS | WASHING MODE |
| STOP MODE | DOUBLE PRESS | WASHING MODE |
| DRIVE MODE | SHORT PRESS | STOP MODE |
| DRIVE MODE | LONG PRESS | LOCK MODE |
| DRIVE MODE | DOUBLE PRESS | LOCK MODE |
| WASHING MODE | SHORT PRESS | STOP MODE |
| WASHING MODE | LONG PRESS | DRIVE MODE |
| WASHING MODE | DOUBLE PRESS | LOCK MODE |
| LOCK MODE | SHORT PRESS | — |
| LOCK MODE | LONG PRESS | WASHING MODE |
| LOCK MODE | DOUBLE PRESS | STOP MODE (OR DRIVE MODE) |

ELECTRICAL APPLIANCE WITH SWITCHABLE OPERATION MODES

BACKGROUND OF THE INVENTION

1. Field of the Invention

The present disclosure relates to an electric appliance, and more particularly to an electric razor.

2. Description of the Related Art

A conventional electric razor includes a motor, a switch, and a locking device (for example, Unexamined Japanese Patent Publication No. 2013-27502). The motor drives a head having a brade. Whenever the switch is pressed, the motor is switched between the driven state and the stopped state. The locking device switches the switch between an unlocked state of enabling the switch operation and a locked state of disabling the switch operation.

SUMMARY OF THE INVENTION

In the conventional electric razor, in order to switch the motor between the driven state and stopped state and in order to switch the switch between the locked state and the unlocked state, the switch and a locking device must be operated individually. Therefore, further improvement in the operability of switching between the operation modes in the electric razor is allowed.

This problem is caused by not only an electric razor, but also a shaving apparatus such as an electric hair clipper, an oral hygiene apparatus such as an electric toothbrush, a cosmetic apparatus such as a dryer or a facial care tool, and an electric tool such as a rotary impact tool.

The objective of the present disclosure is to improve the operability of switching between the operation modes in an electric appliance.

An electric appliance of an aspect of the present disclosure includes a control section having a plurality of operation modes, a driving source controlled by the control section, and a switch for switching between the operation modes. The control section is configured to perform the following processes of:

in order to determine the type of a switch operation, performing a first determination and a second determination in response to the operation duration of the switch; and setting the operation mode after the switch operation in response to the results of the first and second determinations and the operation mode before the switch operation.

In the present aspect, the operability of switching between the operation modes in an electric appliance is improved.

DETAILED DESCRIPTION OF THE PREFERRED EMBODIMENT(S)

[1] An electric appliance of an aspect of the present disclosure includes a control section having a plurality of operation modes, a driving source controlled by the control section, and a switch for switching between the operation modes. The control section is configured to perform the following processes of:

in order to determine the type of a switch operation, performing a first determination and a second determination in accordance with the operation duration of the switch; and setting the operation mode after the switch operation in response to the results of the first and second determinations and the operation mode before the switch operation.

In the present aspect, even when the same type of switch operation is performed, when the operation modes before the switch operation in the electric appliance are different from each other, the operation modes after the switch operation in the electric appliance can be made different from each other. In other words, the operability of switching between the operation modes in the electric appliance is improved.

[2] In the electric appliance of an aspect of the present disclosure, as the first determination, the control section determines that the switch operation is enabled or disabled on the basis of whether the switch operation continues for a first reference period or longer. As the second determination, the control section determines that the switch operation is a long press or a short press on the basis of whether the switch operation continues for a second reference period or longer. Here, the second reference period is longer than the first reference period.

In the present aspect, various switching between the operation modes can be performed using a generally well-known switch operation such as a long press or short press. In other words, the operability of switching between the operation modes in the electric appliance is improved.

[3] In the electric appliance of an aspect of the present disclosure, the operation mode takes a stop mode of stopping the driving source, a drive mode of actuating the driving source, or a washing mode of driving the driving source at a speed higher than that in the drive mode. In the case that the operation mode is the stop mode, when the control section determines that the switch operation is a short press, the control section switches the operation mode to the drive mode. In the case that the operation mode is the stop mode, when the control section determines that the switch operation is a long press, the control section switches the operation mode to the washing mode.

In the present aspect, when the operation mode is the stop mode, one switch operation of a short press or long press of the switch changes the operation mode to the drive mode or the washing mode. Thus, the operability of switching between the operation modes in the electric appliance is improved.

[4] In the electric appliance of an aspect of the present disclosure, in the case that the operation mode is the stop mode, when the control section determines that the switch operation is enabled, the control section switches the operation mode to the drive mode. When the switch operation is subsequently continued and the control section determines that the switch operation is a long press, the control section switches the operation mode from the drive mode to the washing mode.

For example, when the operation mode does not change until the long press of the switch is detected by the second determination, the user can erroneously understand that the electric appliance is failed.

In the present aspect, whenever each of the first and second determinations is applied to the switch operation, the electric appliance responds to it. As a result, the user hardly performs misunderstanding.

[5] In the electric appliance of an aspect of the present disclosure, the operation mode takes a stop mode of stopping the driving source, a drive mode of actuating the driving source, or a lock mode of disabling a short press.

In the case that the operation mode is the drive mode, when the control section determines that the switch operation is a short press, the control section switches the operation mode to the stop mode. In the case that the operation mode is the drive mode, when the control section determines that the switch operation is a long press, the control section switches the operation mode to the lock mode.

In the present aspect, when the operation mode is the drive mode, one switch operation of a short press or long press of the switch changes the operation mode to the stop mode or the lock mode. Thus, the operability of switching between the operation modes in the electric appliance is improved.

[6] In the electric appliance of an aspect of the present disclosure, in the case that the operation mode is the drive mode, when the control section determines that the switch operation is enabled, the control section switches the operation mode to the stop mode. When the switch operation is subsequently continued and the control section determines that the switch operation is a long press, the control section switches the operation mode from the stop mode to the lock mode.

When the electric appliance does not send a response while the user is performing a long press of the switch, the user can erroneously understand that the electric appliance is failed.

In the present aspect, when a long press of the switch is performed in the drive mode, the driving source stops at the time when the switch operation is determined to be enabled. Thus, the user is not apt to erroneously understand that the electric appliance is failed.

Hereinafter, an appropriate exemplary embodiment of the electric appliance of the present disclosure is described with reference to the accompanying drawings.

EXEMPLARY EMBODIMENT

Figure 1:
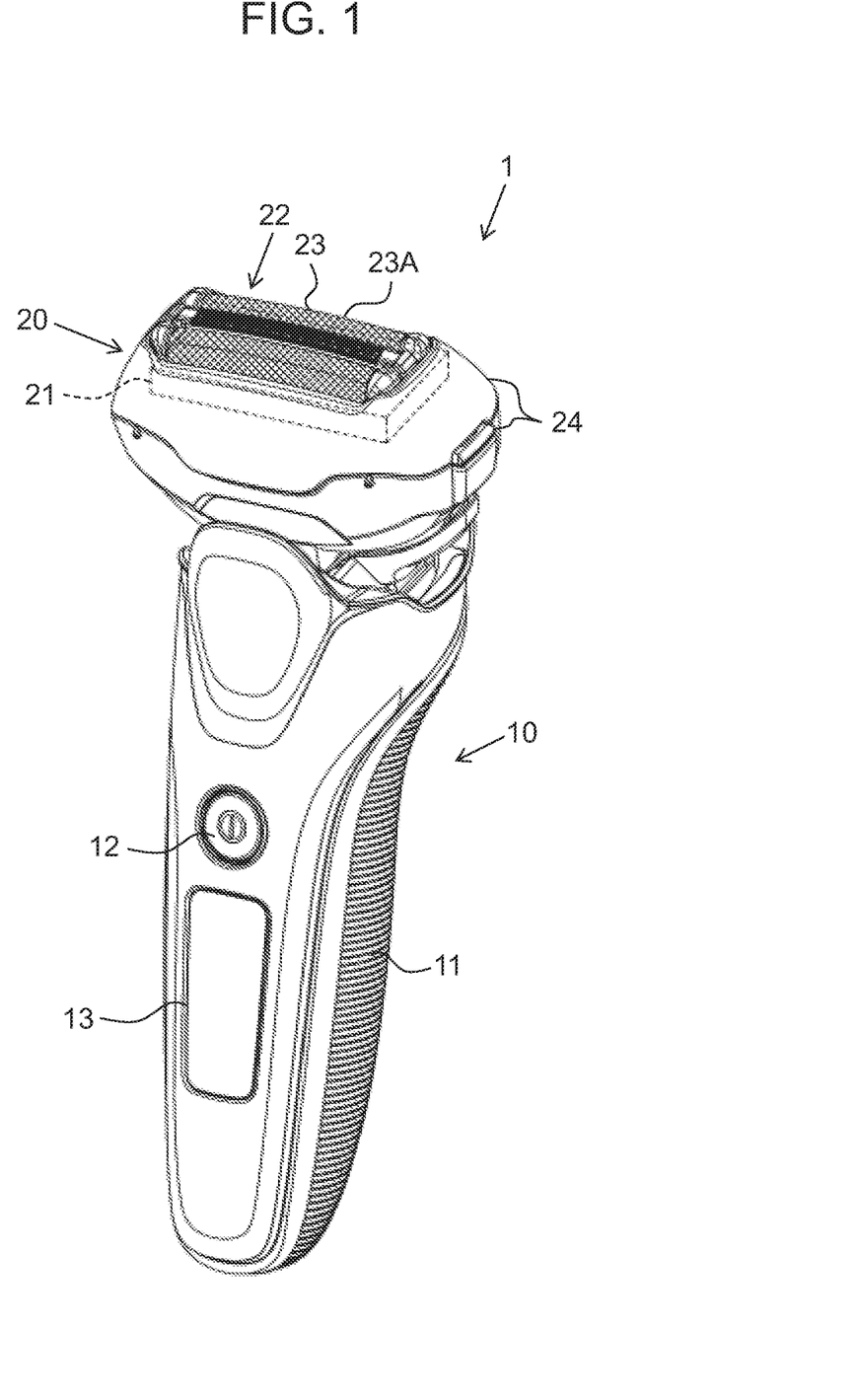
FIG. 1 is a perspective view of an electric razor in accordance with an exemplary embodiment of the present disclosure.

FIG. 1 is a perspective view of electric razor 1 in accordance with an exemplary embodiment.

As shown in FIG. 1, electric razor 1 includes main body 10, and head 20 attached to main body 10 so that head 20 can reciprocate.

Main body 10 includes grip 11 held by the user, and switch 12 as one push button that is attached to grip 11 and is used to switch between operation modes. A battery (not shown) is stored in grip 11.

Main body 10 includes display unit 13 attached to the side having switch 12. Display unit 13 displays the operation mode or remaining battery level of electric razor 1.

Head 20 includes outer blade unit 22, head cover 24 on which outer blade unit 22 is attached, and a pair of inner blade units (not shown) stored in head cover 24.

Outer blades 23 of outer blade unit 22 have many holes 23A through which beards are guided into head 20. The beards guided into head 20 are cut by outer blades 23 and the inner blades (not shown) of the inner blade units. Linear motor 21 as the driving source is stored in head cover 24. Linear motor 21 is actuated in response to the power supply from a battery, and the inner blade units are reciprocated in the longitudinal direction of head 20.

Figure 2:
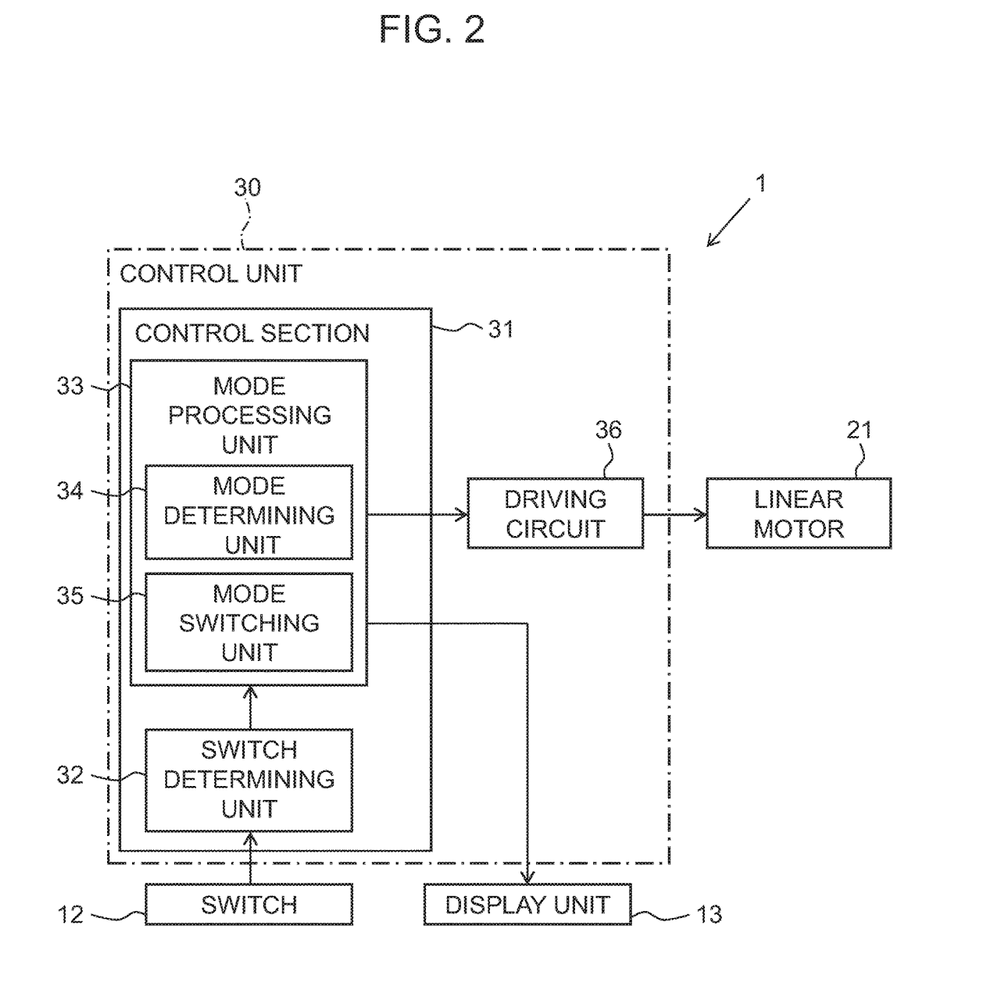
FIG. 2 is a circuit block diagram of the electric razor in accordance with the exemplary embodiment.

FIG. 2 is a circuit block diagram of electric razor 1 in accordance with the exemplary embodiment.

As shown in FIG. 2, electric razor 1 includes control unit 30 for controlling its operation. Control unit 30 includes driving circuit 36 for driving linear motor 21, and control section 31 for controlling driving circuit 36.

When switch 12 is operated, switch 12 outputs an operation signal to control section 31. In the present exemplary embodiment, the operation applied to switch 12 as a push-button switch means to press down switch 12.

Control section 31 is formed of a microcomputer, and includes switch determining unit 32, mode processing unit 33, and a built-in memory (not shown). The built-in memory stores an operation mode of electric razor 1.

As described later, on the basis of the duration of the operation of switch 12, switch determining unit 32 determines whether the switch operation is enabled or disabled and whether the operation of switch 12 is a long press or a short press. Switch determining unit 32 outputs these determinations to mode processing unit 33.

Figure 3A:
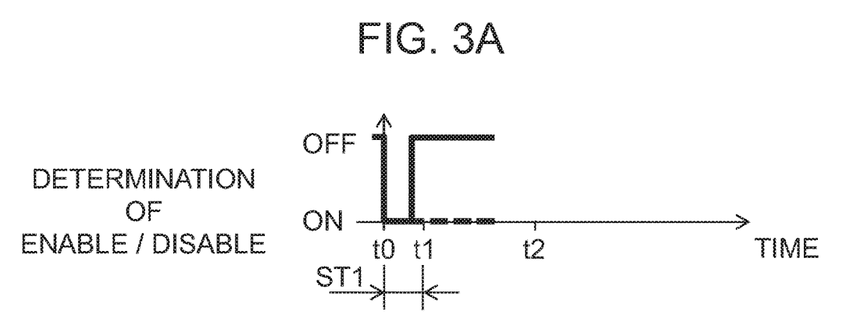
FIG. 3A is a timing chart showing the determination of enable/disable of a switch operation.

FIG. 3A is a timing chart showing the determination of enable/disable of the switch operation on the basis of the operation duration of switch 12.

In the case of the solid line in FIG. 3A, the switch operation starts at time t0 and finishes before time t1, which is the time after a lapse of first reference period ST1 from time t0. In this case, the operation duration of switch 12 is shorter than first reference period ST1, and hence switch determining unit 32 determines that the switch operation is disabled at the completion time of the switch operation.

In the case of the dotted line in FIG. 3A, the switch operation starts at time t0, and continues also after time t1. In this case, the operation duration of switch 12 is longer than first reference period ST1, and hence switch determining unit 32 determines that the operation of switch 12 is enabled at time t1.

Figure 3B:
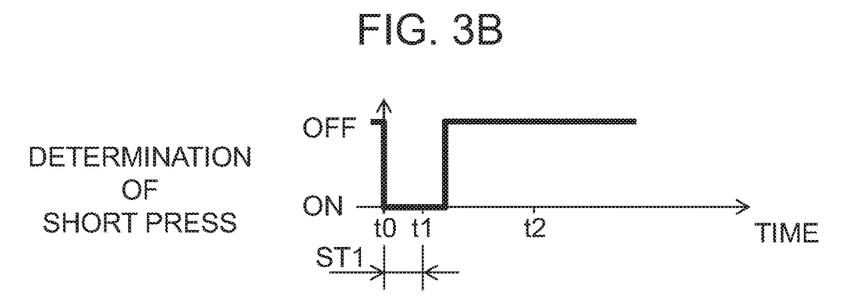
FIG. 3B is a timing chart showing the case that the switch operation is determined to be a short press.
Figure 3C:
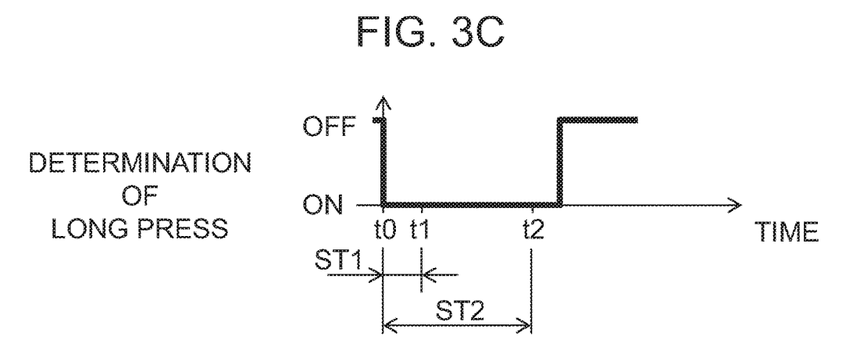
FIG. 3C is a timing chart showing the case that the switch operation is determined to be a long press.

FIG. 3B and FIG. 3C are timing charts showing the cases that the switch operation is determined to be "short press" and the switch operation is determined to be "long press" in response to the operation durations of switch 12, respectively.

In FIG. 3B, the switch operation starts at time t0, and finishes between time t1 and time t2. Here, time t2 is the time after a lapse of second reference period ST2 from time t0. In this case, switch determining unit 32 determines that the switch operation is "short press" at the completion time of the switch operation.

In FIG. 3C, the switch operation starts at time t0, and continues also after time t2. In this case, the operation duration of switch 12 is longer than second reference period ST2, so that switch determining unit 32 determines that the operation of switch 12 is "long press" at time t2.

First reference period ST1 and second reference period ST2 are previously determined through an examination or the like, and are stored in the built-in memory.

Hereinafter, a determination based on first reference period ST1 and a determination based on second reference period ST2 by switch determining unit 32 are referred to as "first determination" and "second determination", respectively. Switch determining unit 32 detects an enabled or disabled switch operation through the first determination, and detects a long press or a short press of switch 12 through the second determination.

The processing returns to FIG. 2. Mode processing unit 33 includes mode determining unit 34 and mode switching unit 35. Mode determining unit 34 sets an operation mode after the switch operation in response to the determination by switch determining unit 32 and the operation mode stored in the built-in memory. Mode switching unit 35 controls driving circuit 36 in response to the operation mode set by mode determining unit 34, and switches the actual operation mode to the set operation mode.

Here, the operation mode stored in the built-in memory is the operation mode before the operation of switch 12, namely the present operation mode. Hereinafter, the present operation mode is simply referred to as "operation mode".

Electric razor 1 has the operation mode that takes a stop mode, a drive mode, a washing mode, or a lock mode.

In the stop mode, linear motor 21 stops and head 20 (FIG. 1) does not work. In the drive mode, linear motor 21 is driven and head 20 reciprocates. In the washing mode, control section 31 drives linear motor 21 at the speed and amplitude of the reciprocating motion appropriate for washing of head 20.

For example, the amplitude of linear motor 21 in the washing mode is smaller than the amplitude in the drive mode. The number of strokes of linear motor 21 in the washing mode is larger than that in the drive mode. The number of strokes means the number of reciprocations of linear motor 21 per unit time.

In the lock mode, the short press of switch 12 is disabled, and the operation mode is not changed. When the short press of switch 12 is detected in the lock mode, mode processing unit 33 displays, on display unit 13 (FIG. 1), a symbol (for example, padlock) indicating that the operation mode is the lock mode.

Figure 4:
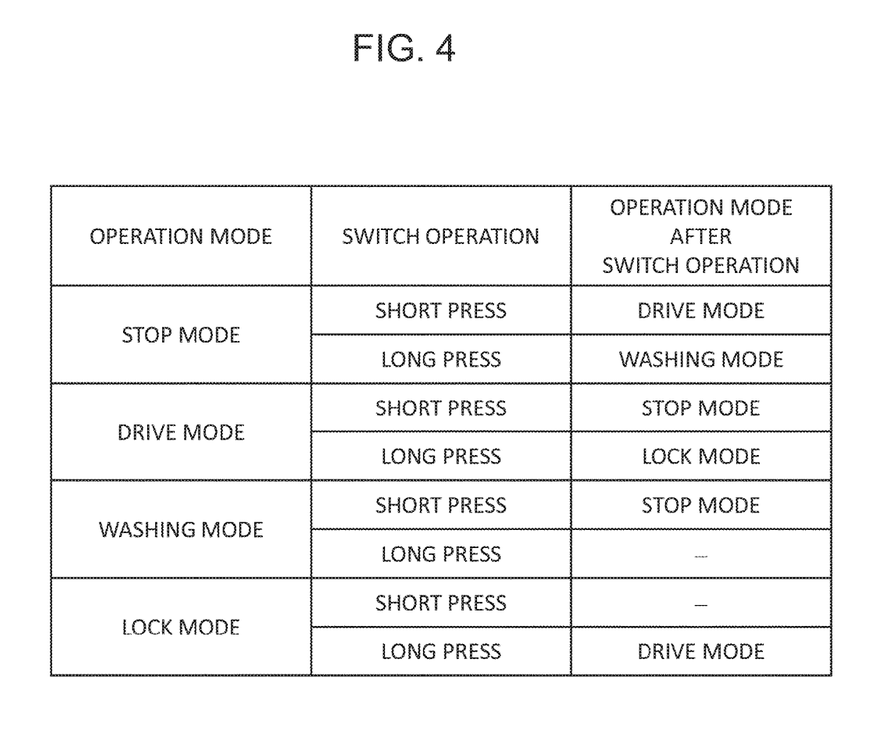
FIG. 4 is a diagram showing the state transition of the electric razor in accordance with the exemplary embodiment.

FIG. 4 shows a state transition table of electric razor 1 in accordance with the exemplary embodiment. FIG. 4 shows the relationship among the operation mode, the type of the switch operation, and the operation mode after the switch operation in the present exemplary embodiment.

Mode processing unit 33 switches between the operation modes in accordance with the table of FIG. 4, for example. After the operation of switch 12, control section 31 updates the operation mode stored in the memory.

When a short press of switch 12 is detected in the case that the operation mode is the stop mode, mode processing unit 33 switches the operation mode to the drive mode.

When a long press of switch 12 is detected in the case that the operation mode is the stop mode, mode processing unit 33 switches the operation mode to the washing mode. When a short press of switch 12 is detected in the case that the operation mode is the washing mode, mode processing unit 33 switches the operation mode to the stop mode.

When mode processing unit 33 switches the operation mode from the stop mode to the washing mode, linear motor 21 is driven as below.

When an enabled switch operation is detected in the case that the operation mode is the stop mode, at this time, linear motor 21 is driven in the drive mode. When the switch operation is subsequently continued and a long press of switch 12 is detected, linear motor 21 is driven in the washing mode.

When a short press of switch 12 is detected in the case that the operation mode is the drive mode, mode processing unit 33 switches the operation mode to the stop mode. When a long press of switch 12 is detected in the case that the operation mode is the drive mode, mode processing unit 33 switches the operation mode to the lock mode.

When a long press of switch 12 is detected in the case that the operation mode is the lock mode, mode processing unit 33 switches the operation mode to the drive mode. When a short press of switch 12 is detected in the case that the operation mode is the lock mode, mode processing unit 33 keeps the lock mode.

When mode processing unit 33 switches the operation mode from the drive mode to the lock mode, linear motor 21 is driven as below.

When an enabled switch operation is detected in the case that the operation mode is the drive mode, at this time, linear motor 21 is stopped. When the switch operation is subsequently continued and a long press of switch 12 is detected, mode processing unit 33 switches the operation mode to the lock mode while keeping the stop of linear motor 21.

A main action effect of electric razor 1 of the present exemplary embodiment is described as below.

As a conventional electric razor, an electric razor is known in which, regardless of whether the operation mode is the stop mode or the drive mode, the operation mode is switched to the washing mode in response to a long press of the switch.

An electric razor is known in which, regardless of whether the operation mode is the stop mode or the drive mode, the operation mode is switched to the lock mode in response to a long press of the switch.

Regardless of the operation mode before the switch operation, these conventional electric razors change the operation mode in response to only a long press of the switch. Therefore, the conventional electric razors can perform the switching to only one type of operation mode in response to a long press of the switch.

In the present exemplary embodiment, when a long press of switch 12 is detected in the case that the operation mode is the stop mode, the operation mode is switched to the washing mode. When a long press of switch 12 is detected in the case that the operation mode is the drive mode, the operation mode is switched to the lock mode.

In the present exemplary embodiment, the switching to two types of operation mode can be performed in response to a long press of switch 12. In other words, the operability of switching between the operation modes in electric razor 1 is improved.

As discussed above, control section 31 of the present exemplary embodiment is formed of a microcomputer. Control section 31 is not limited to a microcomputer. When a programmable microcomputer is employed, however, the processing contents can be easily changed and the degree of freedom in design can be improved.

In order to increase the processing speed, control section 31 may be formed of a logic circuit. Control section 31 may be physically formed of one element or a plurality of elements. When control section 31 is formed of a plurality of elements, control items may be executed by individual elements. In this case, it can be considered that the plurality of elements correspond to one control section.

Hereinafter, the action effect of electric razor 1 of the present exemplary embodiment is summarized.

(1) Electric razor 1 sets the operation mode after the switch operation, in response to the operation mode (operation mode before the operation of switch 12) and the type of the operation of switch 12. Therefore, the operation mode after the switch operation is set in response to the operation mode and the type of the operation of switch 12. In other words, even when the same type of operation of switch 12 is performed, the operation modes after the switch operation can be made different from each other when the operation modes before the operation are different from each other, Thus, differently from the conventional electric razor, both of the switching between operation modes and the switching between the locked state and the unlocked state of switch 12 can be performed with only switch 12. In the present exemplary embodiment, the operability of switching between the operation modes in electric razor 1 is improved.

(2) In the present exemplary embodiment, using a generally well-known switch operation such as a long press or short press, the operability of switching between the operation modes in electric razor 1 can be improved.

(3) Generally, the user uses the washing mode when the user notices dirt on the head in the stop state of electric razor 1. Therefore, preferably, when the operation mode is the stop mode, the operation mode can be switched to the washing mode in response to one switch operation.

In the case that the electric razor has only one type of switch operation similarly to the conventional electric razor, the following processes are required:
 a first switch operation is performed in order to switch the operation mode from the stop mode to the drive mode; and
 a second switch operation is performed in order to switch the operation mode from the drive mode to the washing mode.

In the present exemplary embodiment, when the operation mode is the stop mode, the operation mode is switched from the stop mode to the washing mode via the drive mode by one switch operation. Here, the one switch operation is a long press of switch 12. Thus, the operability of switching between the operation modes in electric razor 1 is improved.

(4) In the conventional electric razor that has only one type of switch operation, in order to switch the operation mode from the drive mode to the lock mode by only one switch operation, the following processes are performed:
 a first switch operation is performed in order to switch the operation mode from the drive mode to the stop mode; and
 a second switch operation is performed in order to switch the operation mode from the stop mode to the lock mode.

In the present exemplary embodiment, when the operation mode is the drive mode, the operation mode is switched from the drive mode to the lock mode via the stop mode by one switch operation. Here, the one switch operation is a long press of switch 12. Thus, the operability of switching between the operation modes in electric razor 1 is improved.

(5) For example, when the operation mode of electric razor 1 does not change until a long press of switch 12 is detected by the second determination, the user can erroneously understand that electric razor 1 is failed.

In the present exemplary embodiment, when an enabled switch operation is detected by the first determination in the case that the operation mode is the stop mode, at this time, linear motor 21 is driven in the drive mode. When the switch operation is subsequently continued and a long press of switch 12 is detected by the second determination, at this time, linear motor 21 is driven in the washing mode.

When an enabled switch operation is detected by the first determination in the case that the operation mode is the drive mode, at this time, linear motor 21 is stopped. When the switch operation is subsequently continued and a long press of switch 12 is detected by the second determination, the operation mode is switched to the lock mode.

In the present exemplary embodiment, whenever each of the first and second determinations is applied to the switch operation, electric razor 1 responds to it. Therefore, the user hardly performs misunderstanding.

(6) Electric razor 1 allows the switching between the operation modes in response to a short press or long press of switch 12, which is one push-button switch. In the present exemplary embodiment, the operability of switching between the operation modes in electric razor 1 is higher than that in the case that the switching between the operation modes is performed by operation of a plurality of switches.

(7) Of four operation modes, the use frequencies of the stop mode and the drive mode are higher than those of the washing mode and the lock mode.

As shown in FIG. 4, control section 31 is configured to perform the switching to the stop mode or the drive mode in response to a short press of switch 12. In the present exemplary embodiment, the switching to the operation mode of a high use frequency is easier than in the case that the same switching is performed in response to a long press of switch 12.

(8) In electric razor 1, when a short press of switch 12 is detected in the case that the operation mode is the lock mode, display unit 13 displays a symbol indicating that the operation mode is the lock mode. In the present exemplary embodiment, the user can easily recognize that the operation mode is the lock mode.

MODIFIED EXAMPLE

Figure 5A:
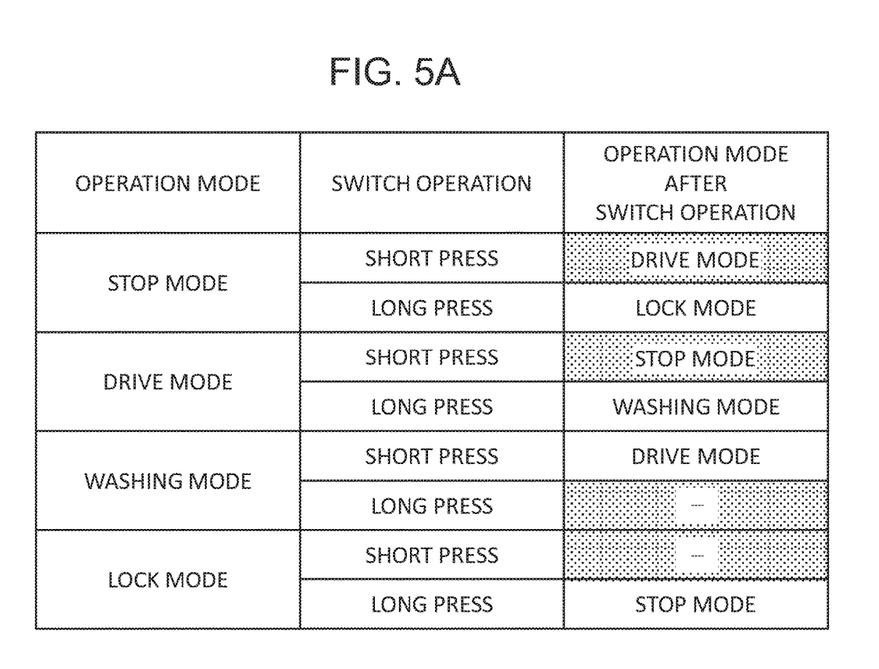
FIG. 5A is a diagram showing the state transition of an electric razor in accordance with a modified example.

The electric razor of the present disclosure can take a form related to one of the following examples or a combination of at least two mutually-consistent examples, for example.
 FIG. 5A shows a state transition table of electric razor 1 of a modified example. FIG. 5A shows the relationship among the operation mode, the type of the switch operation, and the operation mode after the switch operation in the present modified example.

The state transition of electric razor 1 may be modified as shown in FIG. 5A. The state transition in the shaded region in FIG. 5A is the same as that in FIG. 4, so that the state transition in a region other than the shaded region is described.

When a long press of switch 12 is detected in the case that the operation mode is the stop mode, the operation mode is switched to the lock mode. When a long press of switch 12 is detected in the case that the operation mode is the drive mode, the operation mode is switched to the washing mode.

When a short press of switch 12 is detected in the case that the operation mode is the washing mode, the operation mode is switched to the drive mode. When a long press of switch 12 is detected in the case that the operation mode is the lock mode, the operation mode is switched to the stop mode.

The state transition table shown in FIG. 5A may be modified so that, when a long press of switch 12 is detected in the case that the operation mode is the washing mode, the operation mode is switched to one of the drive mode, the stop mode, and the lock mode.

The state transition table shown in FIG. 5A may be modified so that, when a short press of switch 12 is detected in the case that the operation mode is the washing mode, the operation mode is switched to the lock mode or is kept to be the washing mode.

Figure 5B:
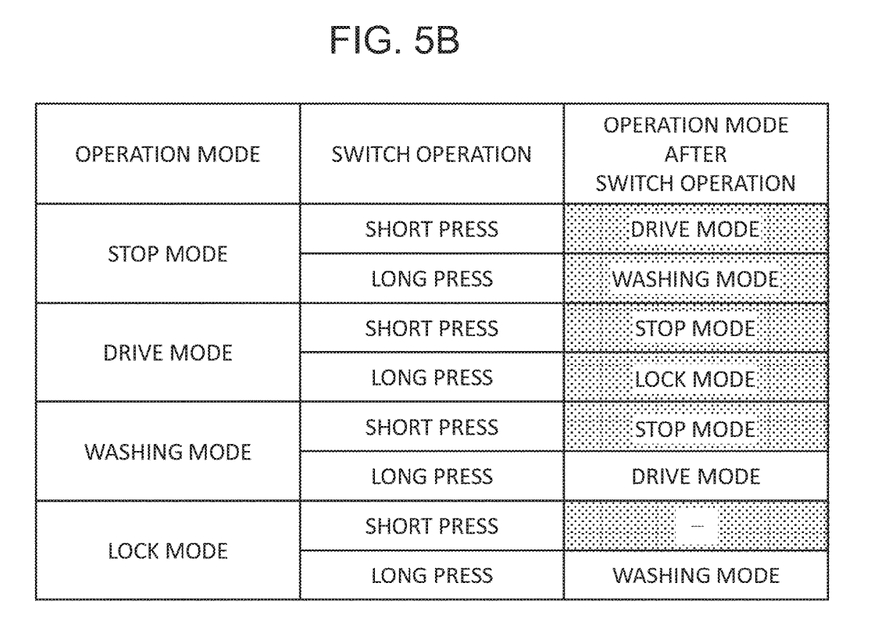
FIG. 5B is a diagram showing the state transition of an electric razor in accordance with another modified example.

FIG. 5B shows a state transition table of electric razor 1 of another modified example. FIG. 5B shows the relationship among the operation mode, the type of the switch operation, and the operation mode after the switch operation in the present modified example.

The state transition of electric razor 1 may be modified as shown in FIG. 5B. The state transition in the shaded region in FIG. 5B is the same as that in FIG. 4, so that the state transition in a region other than the shaded region is described.

When a long press of switch 12 is detected in the case that the operation mode is the washing mode, the operation mode is switched to the drive mode. When a long press of switch 12 is detected in the case that the operation mode is the lock mode, the operation mode is switched to the washing mode.

The state transition table shown in FIG. 5B may be modified so that, when a long press of switch 12 is detected in the case that the operation mode is the washing mode, the operation mode is switched to the stop mode or the lock mode.

The state transition table shown in FIG. 5B may be modified so that, when a short press of switch 12 is detected in the case that the operation mode is the washing mode, the operation mode is switched to the drive mode or the lock mode.

In the exemplary embodiment, electric razor 1 may further include a beard sensor for detecting that beards are inserted into holes 23A in outer blades 23. In the case that the beard sensor is disposed in electric razor 1, beard detection mode may be employed instead of the lock mode or the washing mode in the state transition in FIG. 5A and FIG. 5B. In the beard detection mode, when the beard sensor detects the insertion of beards into holes 23A, the amplitude of linear motor 21 is changed.

In the case that the beard detection mode is employed instead of the lock mode, when a long press of switch 12 is detected in the case that the operation mode is the drive mode, the operation mode is switched to the beard detection mode. When a long press of switch 12 is detected in the case that the operation mode is the beard detection mode, the operation mode is switched to the drive mode.

In the case that the beard detection mode is employed instead of the washing mode, when a long press of switch 12 is detected in the case that the operation mode is the stop mode, the operation mode is switched to the beard detection mode. When a long press of switch 12 is detected in the case that the operation mode is the beard detection mode, the operation mode is switched to the stop mode.

In the state transition tables shown in FIG. 4, FIG. 5A, and FIG. 5B, the beard detection mode may be employed instead of the drive mode.

In the state transition tables shown in FIG. 4, FIG. 5A, and FIG. 5B, the long press of switch 12 may be modified to "double press". The double press means that switch 12 is operated twice in a predetermined period. In this case, instead of the above-mentioned second determination, switch determining unit 32 performs a new second determination of detecting the double press.

In the state transition tables shown in FIG. 4, FIG. 5A, and FIG. 5B, the double press of switch 12 may be added to the switch operation, and the state transition corresponding to the double press may be defined as below. In this case, in addition to the first and second determinations, switch determining unit 32 further performs a third determination of detecting the double press.

Figure 6:
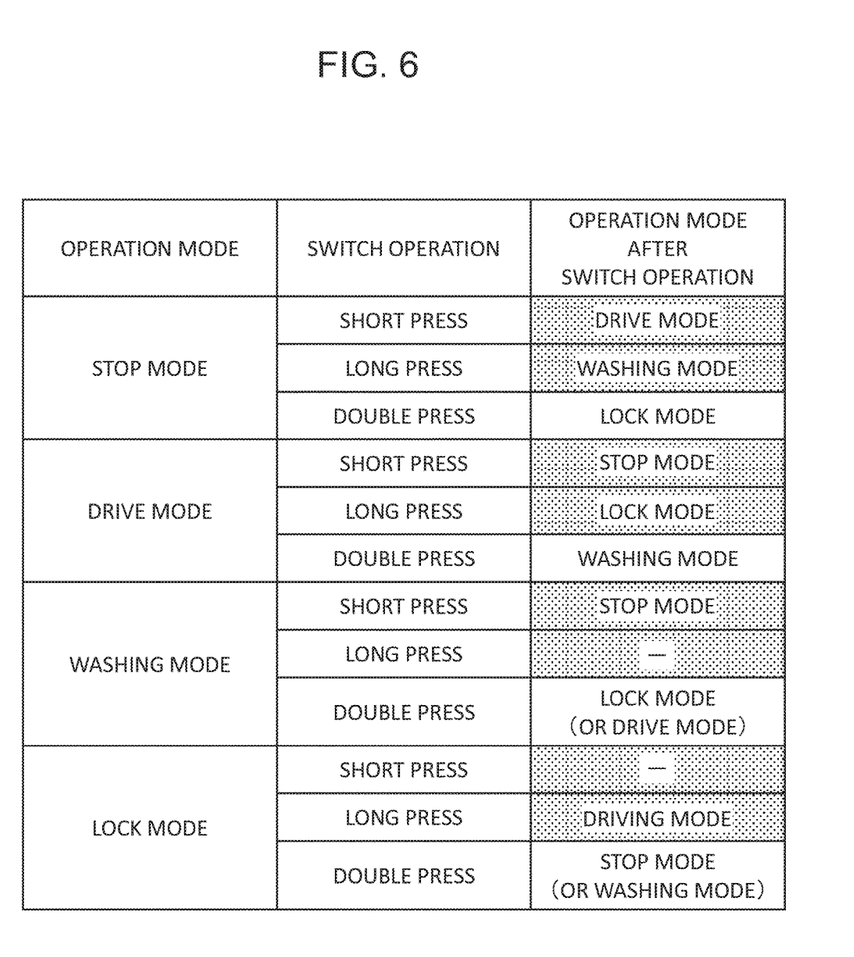
FIG. 6 is a diagram showing the state transition of an electric razor in accordance with yet another modified example.

FIG. 6 shows a state transition table that further includes the following state transition corresponding to the double press of switch 12 in addition to the state transition shown in FIG. 4. The state transition in the shaded region in FIG. 6 is the same as that in FIG. 4.

When a double press of switch 12 is detected in the case that the operation mode is the stop mode, the operation mode is switched to the lock mode. When a double press of switch 12 is detected in the case that the operation mode is the drive mode, the operation mode is switched to the washing mode.

When a double press of switch 12 is detected in the case that the operation mode is the washing mode, the operation mode is switched to the lock mode or the drive mode. When a double press of switch 12 is detected in the case that the operation mode is the lock mode, the operation mode is switched to the stop mode or the washing mode.

Figure 7A:
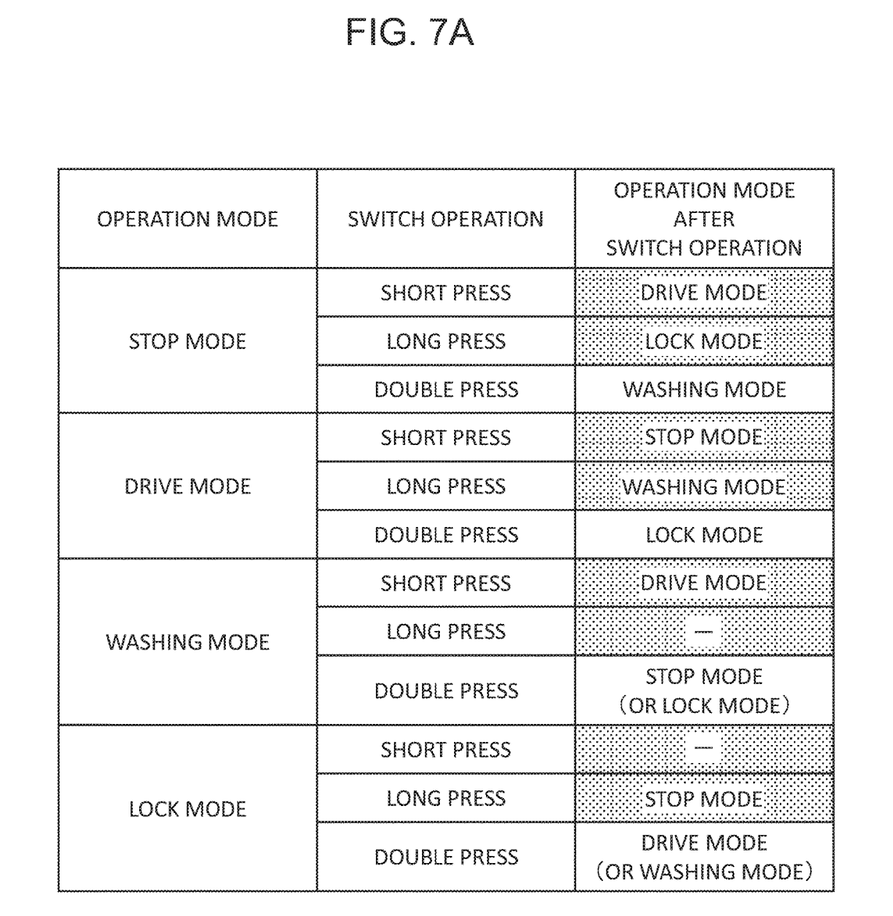
FIG. 7A is a diagram showing the state transition of an electric razor in accordance with still another modified example.

FIG. 7A shows a state transition table that further includes the following state transition corresponding to the double press of switch 12 in addition to the state transition shown in FIG. 5A. The state transition in the shaded region in FIG. 7A is the same as that in FIG. 5A.

When a double press of switch 12 is detected in the case that the operation mode is the stop mode, the operation mode is switched to the washing mode. When a double press of switch 12 is detected in the case that the operation mode is the drive mode, the operation mode is switched to the lock mode.

When a double press of switch 12 is detected in the case that the operation mode is the washing mode, the operation mode is switched to the stop mode or the lock mode. When a double press of switch 12 is detected in the case that the operation mode is the lock mode, the operation mode is switched to the drive mode or the washing mode.

Figure 7B:
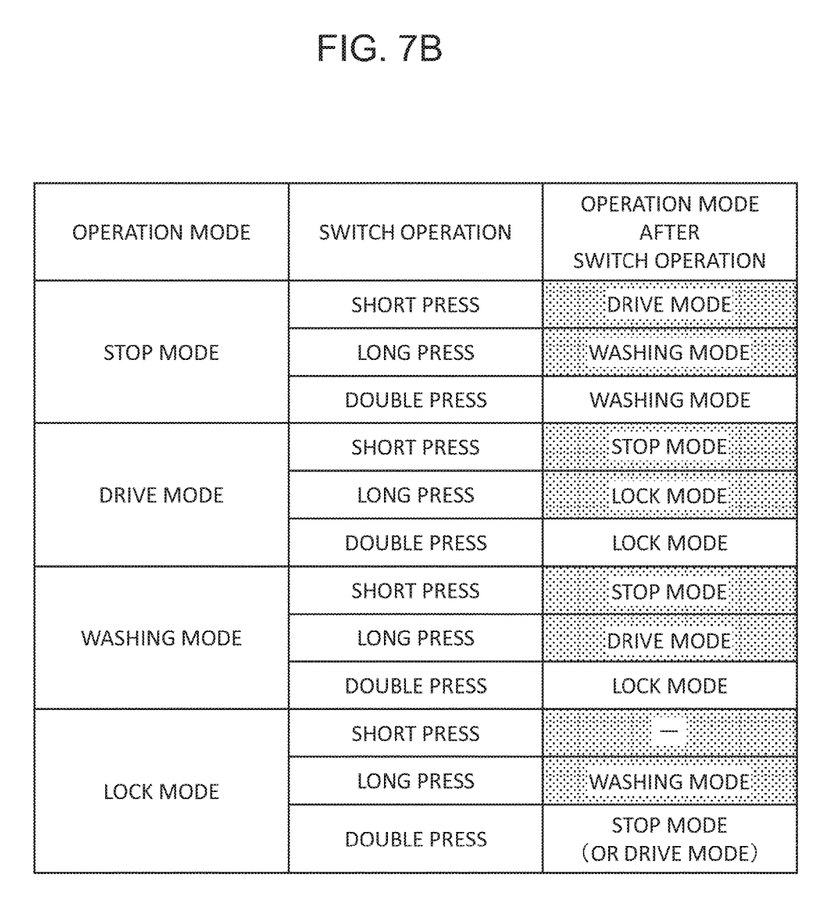
FIG. 7B is a diagram showing the state transition of an electric razor in accordance with still another modified example.

FIG. 7B shows a state transition table that further includes the following state transition corresponding to the double press of switch 12 in addition to the state transition shown in FIG. 5B. The state transition in the shaded region in FIG. 7B is the same as that in FIG. 5B.

When a double press of switch 12 is detected in the case that the operation mode is the stop mode, the operation mode is switched to the washing mode. When a double press of switch 12 is detected in the case that the operation mode is the drive mode, the operation mode is switched to the lock mode.

When a double press of switch 12 is detected in the case that the operation mode is the washing mode, the operation mode is switched to the lock mode. When a double press of switch 12 is detected in the case that the operation mode is the lock mode, the operation mode is switched to the stop mode or the drive mode.

When the operation mode is the washing mode, display unit 13 may display a symbol indicating the washing mode.

The number of outer blade units 22 and the number of inner blades are any numbers.

Display unit 13 can be omitted.

The number of switches 12 may be two or more.

As switch 12, a slide switch is also available.

Electric razor 1 may be a type in which the inner blade unit rotates with respect to the outer blade unit.

The present disclosure can be applied to not only an electric razor, but also a shaving apparatus such as an electric hair clipper, an oral hygiene apparatus such as an electric toothbrush, a cosmetic apparatus such as a dryer, a facial care tool, or a facial massager, and an electric tool such as a rotary impact tool.

What is claimed is:

1. An electric appliance comprising:
a control section having a plurality of operation modes;
a driving source controlled by the control section; and
a switch for switching between the plurality of operation modes,
wherein the control section is configured to
perform a first determination and a second determination in response to a duration of a switch operation in order to determine a type of the switch operation, and
set an operation mode after the switch operation, the operation mode selected from the plurality of operation modes, in response to results of the first determination and the second determination and an operation mode before the switch operation,
wherein the first determination determines whether the switch operation is enabled or disabled, and
the second determination determines whether the switch operation is a long press or a short press, the long press defining where the duration of the switch operation is equal to or longer than a reference period, and the short press defining where the duration of the switch operation is less than the reference period,
the first determination is based on whether or not the switch operation continues for a first reference period or longer, and
the second determination is based on whether or not the switch operation continues for a second reference period or longer, the second reference period being longer than the first reference period,
wherein the plurality of operation modes include a stop mode of stopping the driving source, a drive mode of actuating the driving source, a lock mode of disabling the short press, and a washing mode of driving the driving source at a speed higher than a speed in the drive mode,
wherein the control section is configured so that
in a case that the operation mode before the switch operation is the stop mode,
when the control section determines that the switch operation is the short press,
the control section switches the stop mode to the drive mode, and
when the control section determines that the switch operation is the long press,
the control section switches the stop mode to the washing mode, and
in a case that the operation mode before the switch operation is the drive mode,
when the control section determines that the switch operation is the short press,
the control section switches the drive mode to the stop mode, and
when the control section determines that the switch operation is the long press,
the control section switches the drive mode to the lock mode.

2. The electric appliance according to claim 1, wherein the control section is configured so that
in the case that the operation mode before the switch operation is the stop mode,
when the control section determines that the switch operation is enabled, the control section switches the stop mode to the drive mode, and
when the switch operation is subsequently continued and the control section determines that the switch operation is the long press, the control section switches the drive mode to the washing mode.

3. The electric appliance according to claim 1, wherein the control section is configured so that
in the case that the operation mode before the switch operation is the drive mode,
when the control section determines that the switch operation is enabled, the control section switches the drive mode to the stop mode, and
when the switch operation is subsequently continued and the control section determines that the switch operation is the long press, the control section switches the stop mode to the lock mode.

4. An electric appliance comprising:
a control section having a plurality of operation modes;
a driving source controlled by the control section; and
a switch for switching between the plurality of operation modes,
wherein the switch is configured to be operated for a plurality of durations to change an operation mode, and
wherein the control section is configured to set an operation mode of the control section after a switch operation for a given duration based on a current operation mode of the control section and based on a determination of whether the switch operation is a long press, where the duration of the switch operation is equal to or longer than a reference period, or a short press where the duration of the switch operation is less than the reference period,
wherein the plurality of operation modes includes a stop mode of stopping the driving source, a drive mode of actuating the driving source, a lock mode of disabling the short press, and a washing mode of driving the driving source at a speed higher than a speed in the drive mode,
wherein the control section is configured so that
in a case that the operation mode before the switch operation is the stop mode,
when the control section determines that the switch operation is the short press, the control section switches the stop mode to the drive mode, and
when the control section determines that the switch operation is the long press, the control section switches the stop mode to the washing mode, and
in a case that the operation mode before the switch operation is the drive mode,
when the control section determines that the switch operation is the short press, the control section switches the drive mode to the stop mode, and when the control section determines that the switch operation is the long press, the control section switches the drive mode to the lock mode.

5. The electric appliance according to claim 4, wherein the control section is configured so that in the case that the operation mode before the switch operation is the stop mode, when the control section determines that the switch operation is enabled, the control section switches the stop mode to the drive mode, and when the switch operation is subsequently continued and the control section determines that the switch operation is the long press, the control section switches the drive mode to the washing mode.

6. The electric appliance according to claim 4, wherein the control section is configured so that in the case that the operation mode before the switch operation is the drive mode, when the control section determines that the switch operation is enabled, the control section switches the drive mode to the stop mode, and when the switch operation is subsequently continued and the control section determines that the switch operation is the long press, the control section switches the stop mode to the lock mode.

* * * * *